United States Patent
Price et al.

(10) Patent No.: US 11,765,475 B2
(45) Date of Patent: Sep. 19, 2023

(54) SYSTEMS AND METHODS FOR OBTAINING DARK CURRENT IMAGES

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US); Casey Lee Miller, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/506,218

(22) Filed: Oct. 20, 2021

(65) Prior Publication Data
US 2023/0117006 A1 Apr. 20, 2023

(51) Int. Cl.
*H04N 25/63* (2023.01)
*H04N 25/673* (2023.01)
*H04N 25/46* (2023.01)
*G06T 3/40* (2006.01)
*G06T 5/00* (2006.01)
*G06T 5/20* (2006.01)
*G06T 5/50* (2006.01)

(52) U.S. Cl.
CPC ............... *H04N 25/63* (2023.01); *G06T 3/40* (2013.01); *G06T 5/002* (2013.01); *G06T 5/20* (2013.01); *G06T 5/50* (2013.01); *H04N 25/46* (2023.01); *H04N 25/673* (2023.01); *G06T 2207/20032* (2013.01); *G06T 2207/20216* (2013.01)

(58) Field of Classification Search
None
See application file for complete search history.

(56) References Cited

U.S. PATENT DOCUMENTS

| 7,362,911 B1* | 4/2008 | Frank | G06T 5/50 |
| | | | 382/209 |
| 7,609,869 B2* | 10/2009 | Bernhardt | G06T 5/003 |
| | | | 382/128 |
| 2008/0159646 A1* | 7/2008 | Katagiri | H04N 5/20 |
| | | | 348/E5.076 |

(Continued)

FOREIGN PATENT DOCUMENTS

| EP | 2618560 A1 | 7/2013 |
| EP | 2640054 A2 | 9/2013 |
| WO | 02089467 A1 | 11/2002 |

OTHER PUBLICATIONS

"International Search Report & Written Opinion Issued in PCT Application No. PCT/US2022/034207", dated Oct. 21, 2022, 13 Pages.

*Primary Examiner* — Quan Pham
(74) *Attorney, Agent, or Firm* — WORKMAN NYDEGGER

(57) ABSTRACT

A system for obtaining dark current images includes one or more processors and one or more hardware storage devices storing instructions that are executable by the one or more processors to configure the system to perform various acts. The acts include obtaining a first image frame, generating a first low-pass filtered image by applying a low-pass filter to the first image frame, and generating a first estimated dark current image by subtracting the first low-pass filtered image from the first image frame.

15 Claims, 10 Drawing Sheets

(56) References Cited

U.S. PATENT DOCUMENTS

| | | | | |
|---|---|---|---|---|
| 2008/0284854 A1* | 11/2008 | Thurston, III | ............ | G06T 5/50 |
| | | | | 348/246 |
| 2010/0309315 A1* | 12/2010 | Hogasten | ............... | H04N 7/181 |
| | | | | 348/E5.09 |
| 2012/0075505 A1 | 3/2012 | Van | | |
| 2015/0310594 A1* | 10/2015 | Olsson | ...................... | G06T 5/20 |
| | | | | 382/263 |
| 2019/0191120 A1* | 6/2019 | Ikedo | ......................... | G01J 1/44 |
| 2020/0296380 A1* | 9/2020 | Aono | ................... | H04N 19/593 |

* cited by examiner

SYSTEMS AND METHODS FOR OBTAINING DARK CURRENT IMAGES

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras for facilitating image capture, video capture, and/or other functions. For instance, cameras of an MR system may utilize images and/or depth information obtained using the camera(s) to provide pass-through views of a user's environment to the user. An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time-of-flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

A pass-through view can aid users in avoiding disorientation and/or safety hazards when transitioning into and/or navigating within a mixed-reality environment. Pass-through views may also enhance user views in low visibility environments. For example, mixed-reality systems configured with long wavelength thermal imaging cameras may facilitate visibility in smoke, haze, fog, and/or dust. Likewise, mixed-reality systems configured with low light imaging cameras facilitate visibility in dark environments where the ambient light level is below the level required for human vision.

To facilitate imaging of an environment for generating a pass-through view, some MR systems include image sensors that utilize complementary metal-oxide-semiconductor (CMOS) and/or charge-coupled device (CCD) technology. For example, such technologies may include image sensing pixel arrays where each pixel is configured to generate electron-hole pairs in response to detected photons. The electrons may become stored in per-pixel capacitors, and the charge stored in the capacitors may be read out to provide image data (e.g., by converting the stored charge to a voltage).

However, such image sensors suffer from a number of shortcomings. For example, the signal to noise ratio for a conventional image sensor may be highly affected by read noise, especially when imaging under low visibility conditions. For instance, under low light imaging conditions (e.g., where ambient light is below about 10 lux, such as within a range of about 1 millilux or below), imaging sensors may detect only a small number of photons, which may cause the read noise and/or fixed pattern noise to approach or exceed the signal detected by the imaging pixel and decrease the signal-to-noise ratio.

The dominance of read noise and/or fixed pattern noise in a signal detected by a CMOS or CCD image sensor is often exacerbated when imaging at a high frame rate under low light conditions. Although a lower framerate may be used to allow a CMOS or CCD sensor to detect enough photons to allow the signal to avoid being dominated by read noise, utilizing a low framerate often leads to motion blur in captured images. Motion blur is especially problematic when imaging is performed on an HMD or other device that undergoes regular motion during use.

In addition to affecting pass-through imaging, the read noise and/or motion blur associated with conventional image sensors may also affect other operations performed by HMDs, such as late stage reprojection, rolling shutter corrections, object tracking (e.g., hand tracking), surface reconstruction, semantic labeling, 3D reconstruction of objects, and/or others.

To address shortcomings associated with CMOS and/or CCD image sensors, devices have emerged that utilize single photon avalanche diode (SPAD) image sensors. A SPAD pixel is operated at a bias voltage that enables the SPAD to detect a single photon. Upon detecting a single photon, an electron-hole pair is formed, and the electron is accelerated across a high electric field, causing avalanche multiplication (e.g., generating additional electron-hole pairs). Thus, each detected photon may trigger an avalanche event. A SPAD may operate in a gated manner (each gate corresponding to a separate shutter operation), where each gated shutter operation may be configured to result in a binary output. The binary output may comprise a "1" where an avalanche event was detected during an exposure (e.g., where a photon was detected), or a "0" where no avalanche event was detected.

Separate shutter operations may be performed consecutively and integrated over a frame capture time period. The binary output of the consecutive shutter operations over a frame capture time period may be counted, and an intensity value may be calculated based on the counted binary output.

An array of SPADs may form an image sensor, with each SPAD forming a separate pixel in the SPAD array. To capture an image of an environment, each SPAD pixel may detect avalanche events and provide binary output for consecutive shutter operations in the manner described herein. The per-pixel binary output of consecutive shutter operations over a frame capture time period may be counted, and per-pixel intensity values may be calculated based on the counted per-pixel binary output. The per-pixel intensity values may be used to form an intensity image of an environment.

Although SPAD sensors show promise for overcoming various shortcomings associated with CMOS or CCD sensors, implementing SPAD sensors for image and/or video capture is still associated with many challenges. For example, there is an ongoing need and desire for improvements to the image quality of SPAD imagery, particularly for SPAD imagery captured under low light conditions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices for obtaining dark current images.

Some embodiments provide a system that includes one or more processors, and one or more hardware storage devices storing instructions that are executable by the one or more processors to configure the system to perform various acts. The acts include obtaining a first image frame, generating a first low-pass filtered image by applying a low-pass filter to the first image frame, and generating a first estimated dark current image by subtracting the first low-pass filtered image from the first image frame.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
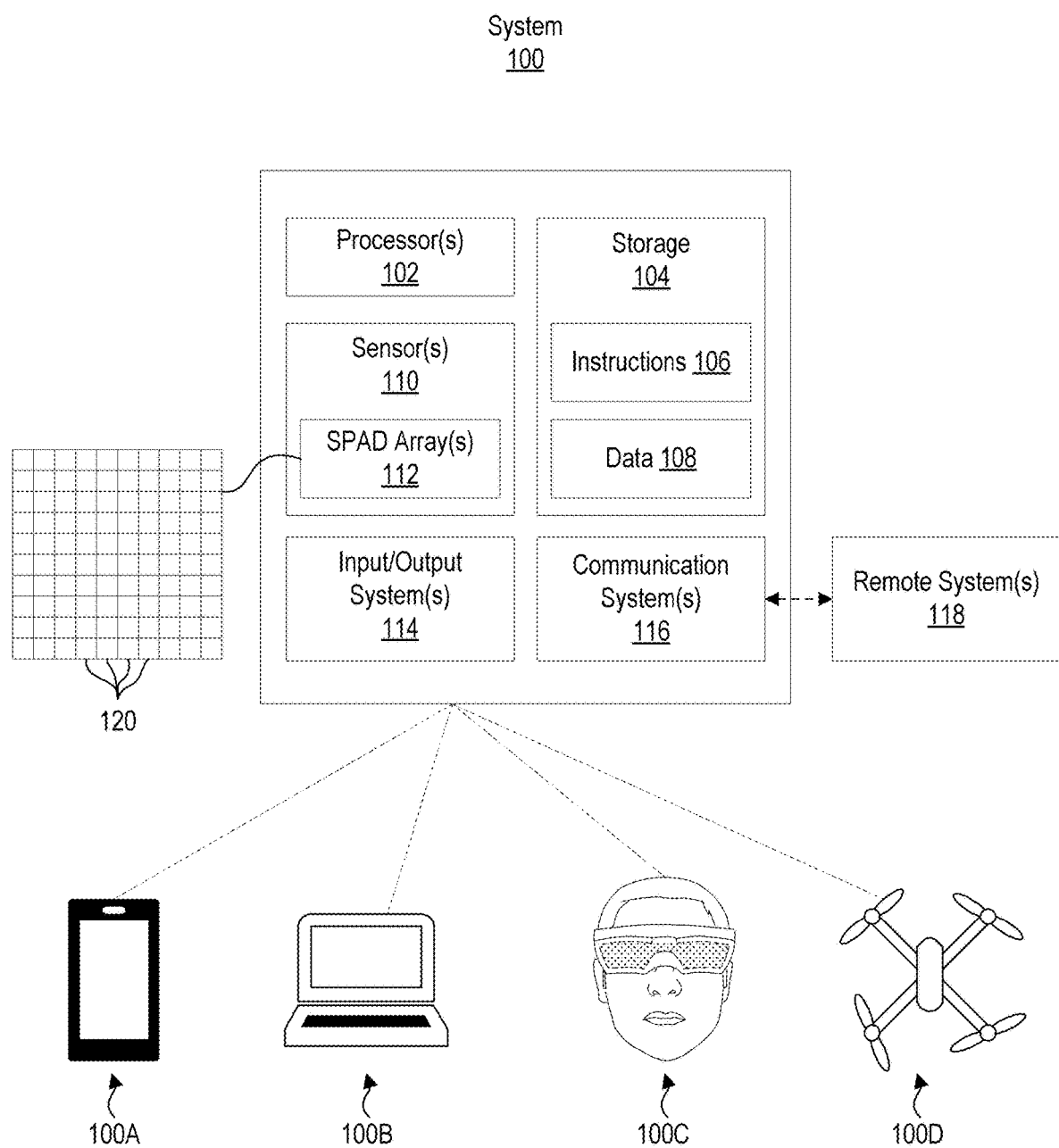
FIG. 1 illustrates example components of an example system that may include or be used to implement one or more disclosed embodiments.

Disclosed embodiments are generally directed to systems, methods, and devices for obtaining dark current images.

Examples of Technical Benefits, Improvements, and Practical Applications

Those skilled in the art will recognize, in view of the present disclosure, that at least some of the disclosed embodiments may be implemented to address various shortcomings associated with at least some conventional imaging systems, particularly for imaging under low light conditions. The following section outlines some example improvements and/or practical applications provided by the disclosed embodiments. It will be appreciated, however, that the following are examples only and that the embodiments described herein are in no way limited to the example improvements discussed herein.

As noted above, there is an ongoing need and desire for improvements to the image quality of SPAD imagery, particularly for SPAD imagery captured under low light conditions. For example, challenge associated with image acquisition using SPADs is signal noise brought about by dark current. Dark current (sometimes referred to as reverse bias leakage current) refers to a small electric current that flows through photosensitive devices (e.g., SPADs) even when no photons are entering the device. Dark current can be thermally induced or brought about by crystallographic and/or manufacturing irregularities and/or defects.

In SPADs, dark current can cause an electron-hole pair to be generated in the depletion region and can trigger avalanche events, even when the SPAD is not detecting a photon. Avalanche events brought about by dark current are typically counted as detected photons, which can cause the binary output of a SPAD to include false counts (or "dark counts"). In SPAD imagery, dark counts can cause the intensity values assigned to at least some SPAD pixels to by inaccurately high, which can add noise to SPAD imagery. In some instances, the effects of dark counts are prominent when imaging under low light conditions, contributing to high fixed pattern noise that degrades user experiences. These pixels or groups of pixels, also known as hot clusters, are regions with higher dark current (also referred to as "dark counts") than adjacent pixels.

One technique for compensating for dark current in SPAD imagery includes obtaining a dark current image that indicates which SPAD pixels of a SPAD array generate dark counts and/or the quantity of dark counts generated by different SPAD pixels. In some instances, dark current images can be captured during device calibration by covering the SPAD sensor and performing image capture operations, thereby resulting in dark current images that indicate the locations and/or prevalence of dark counts among the SPAD pixels. The dark current image can then be used at runtime to modify images captured using the SPAD array to compensate for dark counts, such as by performing a subtraction operation that subtracts the dark current image from the captured SPAD imagery.

However, SPAD sensors can degrade and/or otherwise change over time, which may change the amount of dark current generated by SPAD pixels and/or may cause additional SPAD pixels to generate dark current. Thus, one aspect of the present disclosure is to facilitate generation of dark current images at runtime, thereby providing systems that are able to generate updated dark current images that account for degradations and/or changes to SPAD sensors over time (e.g., without prompting a user to cover the SPAD sensors to capture updated dark current images).

Disclosed embodiments include, or are configured to perform, various acts associated with generating dark current images at runtime. For example, a system configured to obtain a dark current image may be configured to obtain an image frame (e.g., an image frame captured using a SPAD array), generate a low-pass filtered image by applying a low-pass filter to the image frame, and generate an estimated dark current image by subtracting the low-pass filtered image from the image frame. Additional estimated dark current images may be generated in like manner (e.g., each based on a respective captured image frame and a respectively generated low-pass filtered image). Multiple estimated dark current images may be used to generate a final dark current image (e.g., by weighted averaging, where per-pixel weights are determined based on average values of surrounding pixels).

Thus, one or more final dark current images may be obtained using images captured at runtime. The final dark current image may be used to generate dark current compensated images, such as by subtracting the final dark current image from newly captured imagery (e.g., newly captured SPAD imagery). Final dark current images may be captured at runtime according to any suitable interval, timing, or schedule.

Therefore, in accordance with the present disclosure, dark current images may be obtained in a manner that accounts for image sensor degradation over time. Furthermore, the disclosed techniques may furthermore provide dark current compensation functionality in a manner that advantageously avoids reliance on SPAD sensor temperature data at runtime.

Although the present disclosure focuses, in at least some respects, on examples that include SPAD sensors, the principles disclosed herein may be applied to images captured using other types of image sensors (e.g., CMOS and/or CCD image sensors).

Having just described some of the various high-level features and benefits of the disclosed embodiments, attention will now be directed to FIGS. 1 through 10. These Figures illustrate various conceptual representations, architectures, methods, and supporting illustrations related to the disclosed embodiments.

Example Systems and Techniques for Obtaining Dark Current Images

FIG. 1 illustrates various example components of a system 100 that may be used to implement one or more disclosed embodiments. For example, FIG. 1 illustrates that a system 100 may include processor(s) 102, storage 104, sensor(s) 110, SPAD array(s) 112, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with imaging using SPAD arrays. The actions may rely at least in part on data 108 (e.g., avalanche event counting or tracking, etc.) stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 118 may comprise any combination of software or hardware components that are operable to facilitate communication between on-system components/devices and/or with off-system components/devices. For example, the communications system(s) 118 may comprise ports, buses, or other physical connection apparatuses for communicating with other devices/components. Additionally, or alternatively, the communications system(s) 118 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more image sensors, microphones, thermometers, barometers, magnetometers, accelerometers, gyroscopes, and/or others.

FIG. 1 also illustrates that the sensor(s) 110 may include SPAD array(s) 112. As depicted in FIG. 1, a SPAD array 112 may comprise an arrangement of SPAD pixels 120 that are each configured to facilitate avalanche events in response to sensing a photon, as described hereinabove. After detecting a photon, the SPAD pixels 120 may be recharged to prepare the SPAD pixels 120 for detecting additional avalanche events. SPAD array(s) 112 may be implemented on a system 100 (e.g., an MR HMD) to facilitate various functions such as, by way of non-limiting example, image capture and/or computer vision tasks.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), and/or other devices. Although the present description focuses, in at least some respects, on utilizing an HMD to implement techniques of the present disclosure, additional or alternative types of systems may be used.

Figure 2:
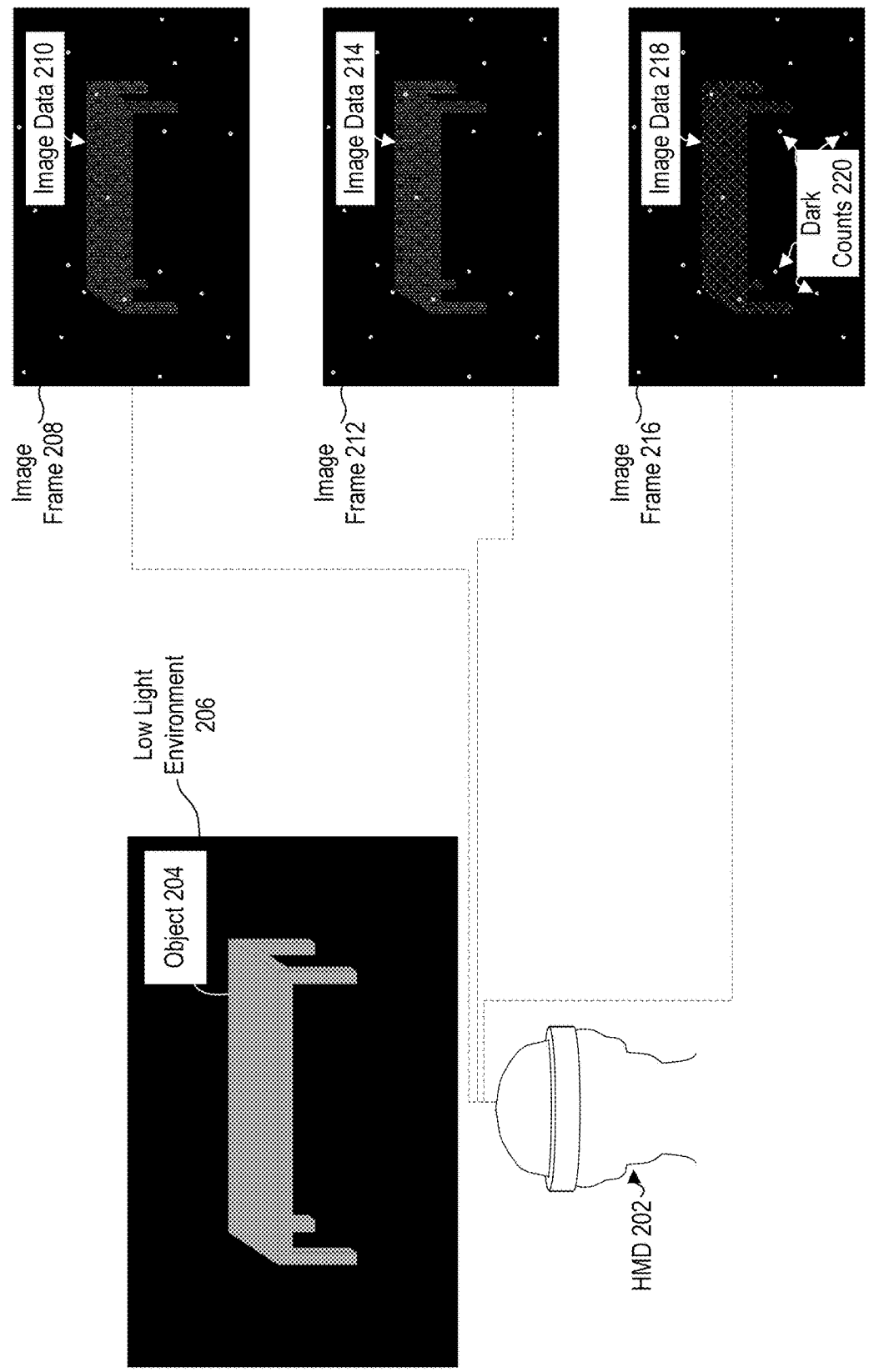
FIG. 2 illustrates an example representation of capturing image frames of a low light environment using a single photon avalanche diode (SPAD) array.

FIG. 2 illustrates an example representation of capturing image frames of a low light environment using a single photon avalanche diode (SPAD) array. In particular, FIG. 2 shows an HMD 202 capturing image frames 208, 212, and 216 of an object 204 within a low light environment 206. The HMD 202 corresponds, in at least some respects, to the system 100 disclosed hereinabove. For example, the HMD 202 may include a SPAD array (e.g., corresponding to SPAD array(s) 112) that includes SPAD pixels (e.g., corresponding to SPAD pixels 120). Each SPAD pixel of the SPAD array, is configurable to trigger avalanche events in response to detecting photons. The number of detected avalanche events may be used to generate image data (e.g., image data 210, 214, and 218) for intensity images, such as image frames 208, 212, and 216. The HMD may capture the image frames 208, 212, and 216 at different timepoints and/or different poses.

As is evident from FIG. 2, the image data 218 resulting from the binary counts of the SPAD pixels for forming the image frame 216 provide a noisy representation of the object 204. For example, FIG. 2 illustrates high-frequency noise 220 within the image frame 216, which may at least partially result from dark counts obtained from one or more SPAD pixels of the SPAD array of the HMD 202. Similar high-frequency noise and dark counts are depicted in image frames 208 and 212.

In accordance with the present disclosure, as will be described in more detail hereinbelow, image frames captured by a SPAD sensor (or other imaging device) may be used to obtain dark current images. Such dark current images may be used to generate dark current compensated images (e.g., by subtracting the dark current images from captured images) that reduce or eliminate the prevalence of the dark current noise. An overview of the techniques used to obtain dark current images from image frames captured at runtime is provided with reference to FIGS. 3 through 5.

Figure 3:
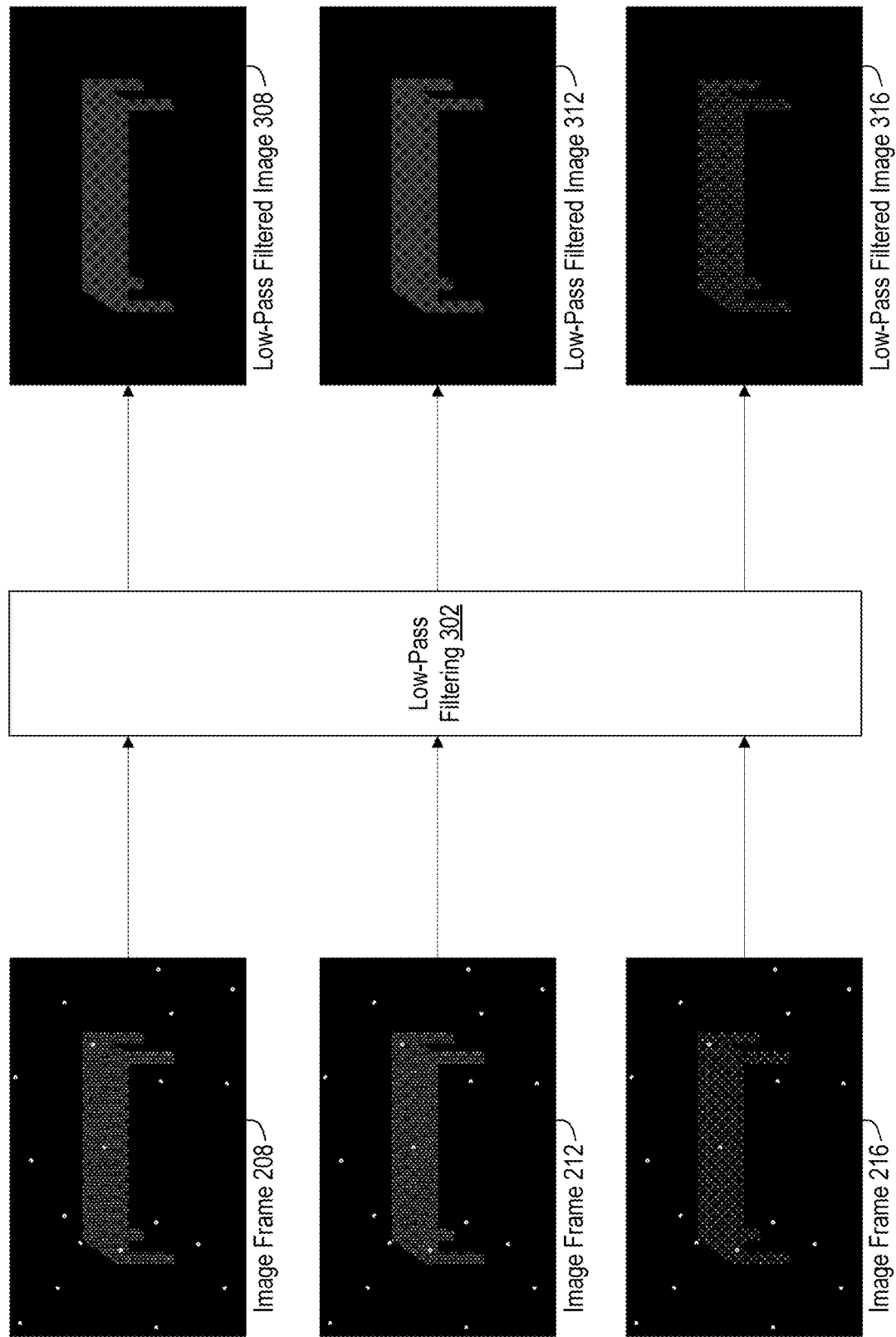
FIG. 3 illustrates a conceptual representation of generating low-pass filtered images based on SPAD imagery.

FIG. 3 illustrates a conceptual representation of generating low-pass filtered images based on SPAD imagery. In particular, FIG. 3 depicts low-pass filtering 302 applied to the image frames 208, 212, and 216 to generate respective low-pass filtered images 308, 312, and 316 (corresponding, respectively, to image frames 208, 212, and 216). As depicted in FIG. 3, the low-pass filtered images 308, 312, and 316 comprise reduced high-frequency noise relative to the image frames upon which they are based (i.e., image frame 208 for low-pass filtered image 308, image frame 212 for low-pass filtered image 312, and image frame 216 for low-pass filtered image 316). In this regard, the low-pass filtered images 308, 312, and 316 may be regarded as generally representative of the one or more "background" objects (e.g., object 204) captured in the image frames 208, 212, and 216, with the (apparently) "foreground" noise substantially filtered out.

The low-pass filtering 302 may comprise one or more of various types of filtering operations, such as median filtering, mean filtering, Gaussian filtering, and/or others. Median filtering may comprise generating each output pixel as a median of the input pixels with pixel coordinates that neighbor the pixel coordinates of the output pixel (e.g., using a predefined kernel centered on the output pixel coordinates).

Although conventional median filtering may be successful in reducing high-frequency noise in the output images, median filtering typically utilizes sorting operations to determine the median value from among the input pixel values, which may be computationally costly and time-consuming. Accordingly, in some embodiments, the low-pass filtering 302 may comprise hierarchical median filtering as will be described in more detail hereinafter with reference to FIGS. 6 and 7.

Figure 4:
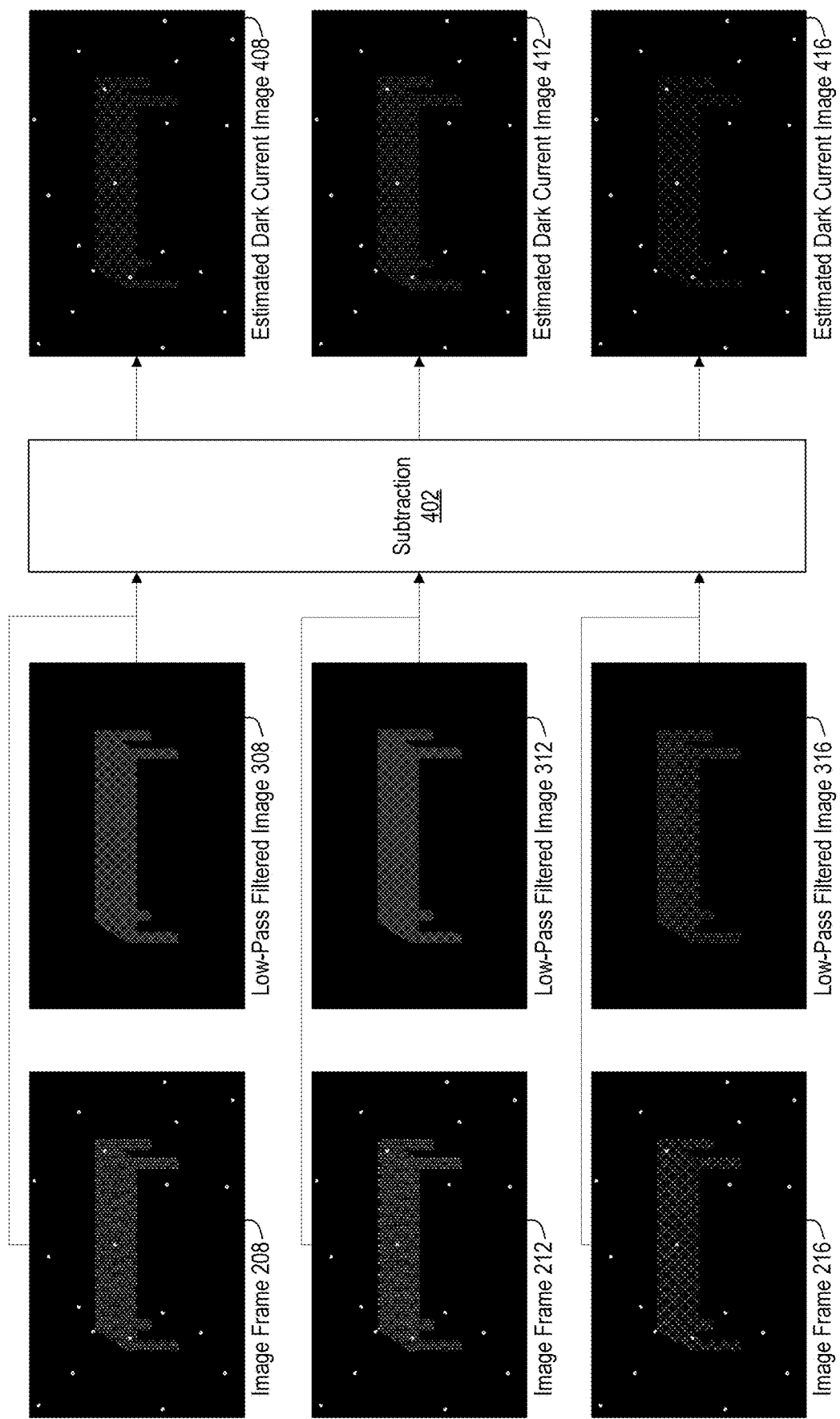
FIG. 4 illustrates a conceptual representation of generating estimated dark current images based on SPAD imagery and low-pass filtered images.

Based on the low-pass filtered images, a system may generate estimated dark current images. FIG. 4 illustrates a conceptual representation of generating estimated dark current images based on SPAD imagery and low-pass filtered images. In particular, FIG. 4 illustrates subtraction 402 applied to subtract the low-pass filtered images 308, 312, and 316 from their corresponding image frames 208, 212, and 216, respectively. The subtraction 402 may be performed on a pixel-by-pixel basis, subtracting each pixel value of each low-pass filtered image from each corresponding pixel value (with the same pixel coordinates) of each corresponding captured image frame.

As noted above, the low-pass filtered images may be regarded as representing the "background" objects of the captured scene, with the "foreground" noise filtered out. Along these lines, the captured image frames (e.g., image frames 208, 212, and 216) may be regarded as including both the "background" objects as well as the "foreground" noise. Thus, subtracting the low-pass filtered images from the captured image frames may be regarded as resulting in image that includes the "foreground" noise with the "background" objects substantially removed therefrom. Such images are represented in FIG. 4 as the estimated dark current images 408, 412, and 416, depicted as output of the subtraction 402 based on each corresponding set of image frames and low-pass filtered images (i.e., low-pass filtered image 308 subtracted from image frame 208 produces estimated dark current image 408, low-pass filtered image 312 subtracted from image frame 212 produces estimated dark current image 412, and low-pass filtered image 316 subtracted from image frame 216 produces estimated dark current image 416).

With the "background" objects substantially removed from the estimated dark current images 408, 412, and 416, the remaining "foreground" high-frequency noise shown in the estimated dark current images 408, 412, and 416 may provide an estimate of the dark counts produced by the SPAD array that captured the image frames 208, 212, and 216 (e.g., an estimate of the SPAD pixels that produce dark counts). However, as depicted in the example of FIG. 4, faint representations of the "background" objects may still be present after the subtraction 402 in the estimated dark current images 408, 412, and 416 due to the nature of low-pass filtering (e.g., median filtering or hierarchical median filtering).

Figure 5:
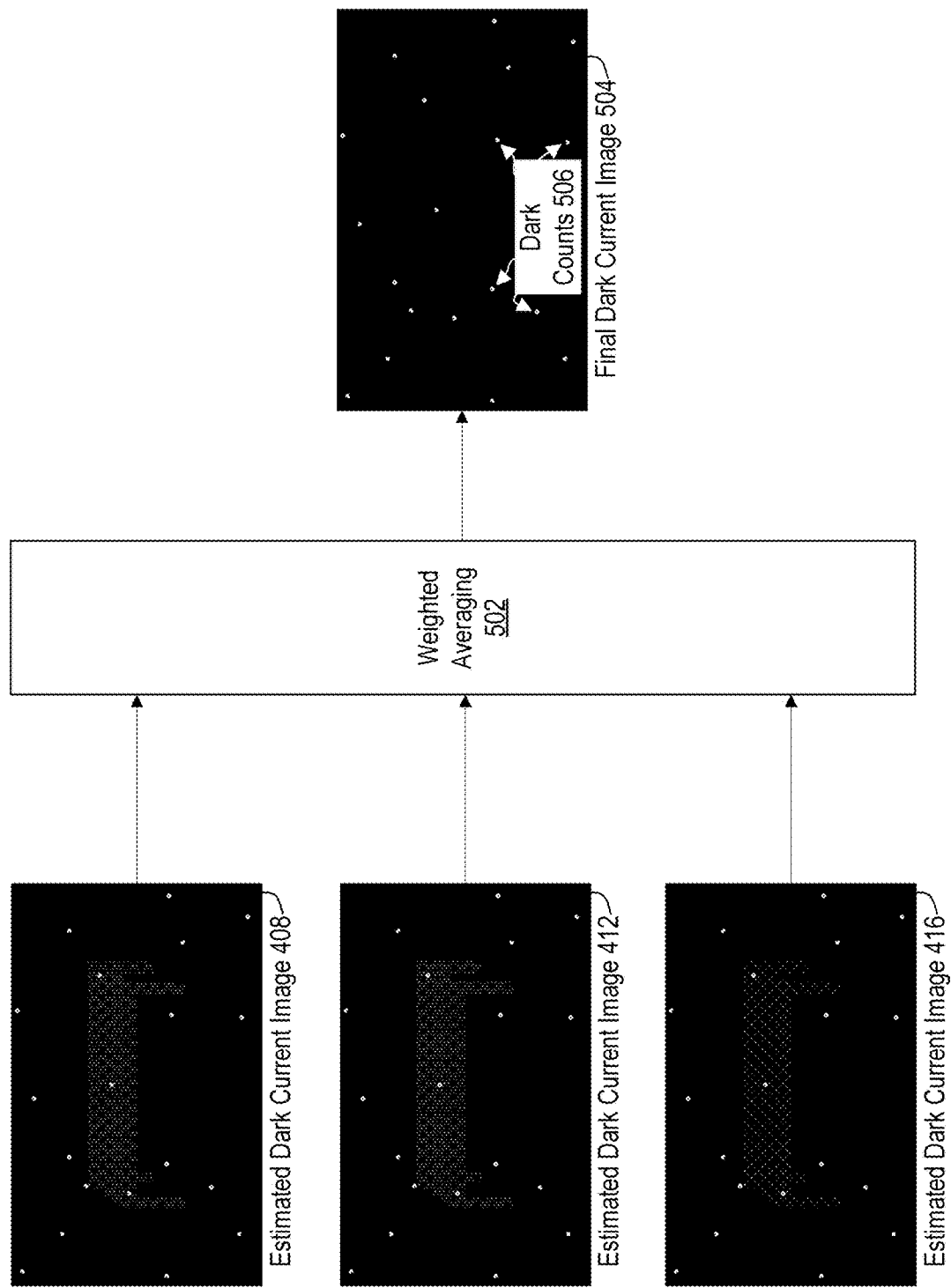
FIG. 5 illustrates a conceptual representation of generating a final dark current image based on estimated dark current images.

Thus, in some instances, multiple estimated dark current images may be utilized to generate a final dark current image that further eliminates the "background" objects, resulting in a more precise representation of the dark counts associated with the image sensor (relative to the estimated dark current images). FIG. 5 illustrates a conceptual representation of generating a final dark current image based on estimated dark current images. In particular, FIG. 5 illustrates weighted averaging 502 performed to generate a final dark current image 504 based on the estimated dark current images 408, 412, and 416.

The weighted averaging 502 may utilize weights to combine/average pixel values of pixels in the estimated dark current images 408, 412, and 416 that have common coordinates to generate a value for an output pixel (with the same coordinates) of the final dark current image 504. The weights for each common-coordinate pixel of the different estimated dark current images 408, 412, and 416 may be determined in various ways, such as by using a negative exponential of an average pixel value of neighboring pixels. Additional details related to the weighted averaging 502 are discussed hereinafter with reference to FIG. 8.

As depicted in FIG. 5, the final dark current image 504 includes dark counts 506, with representations of the "background" objects substantially removed. The final current image 504 may thus be used to generate dark current compensated images (see FIG. 9).

Figure 6:
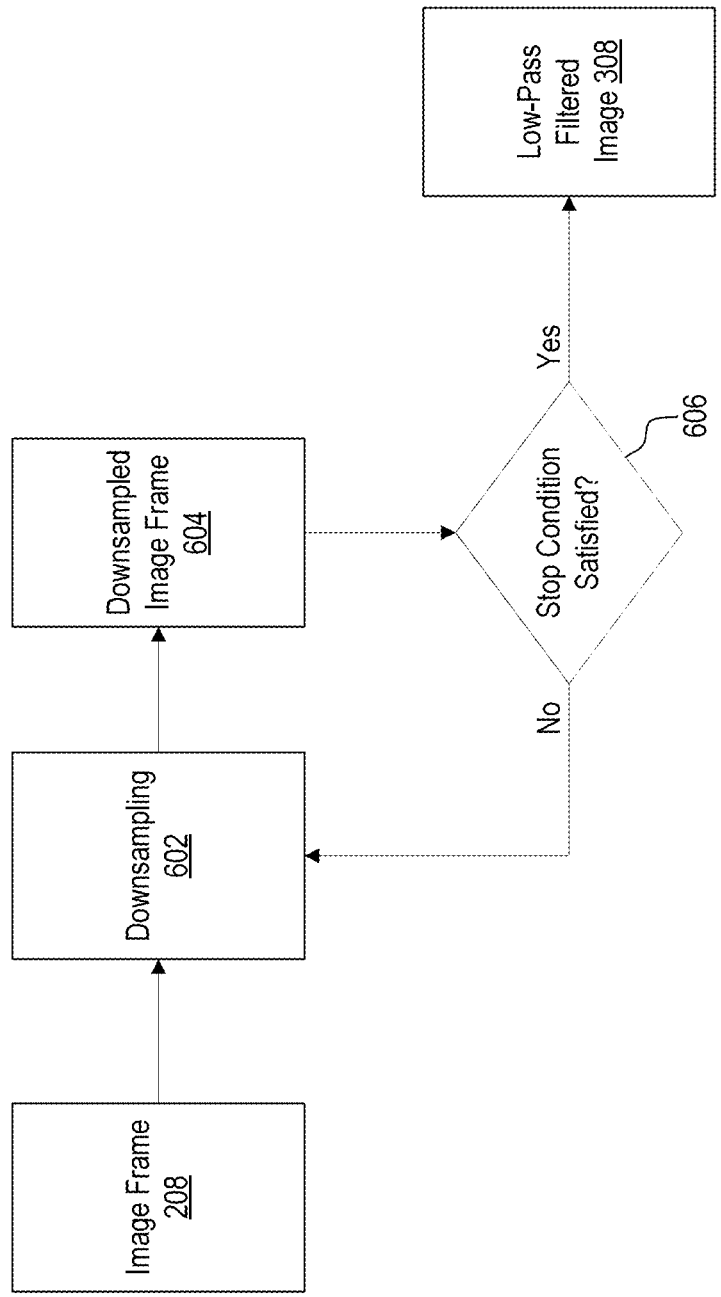
FIG. 6 illustrates an example block diagram depicting acts associated with generating a low-pass filtered image.
Figure 7:
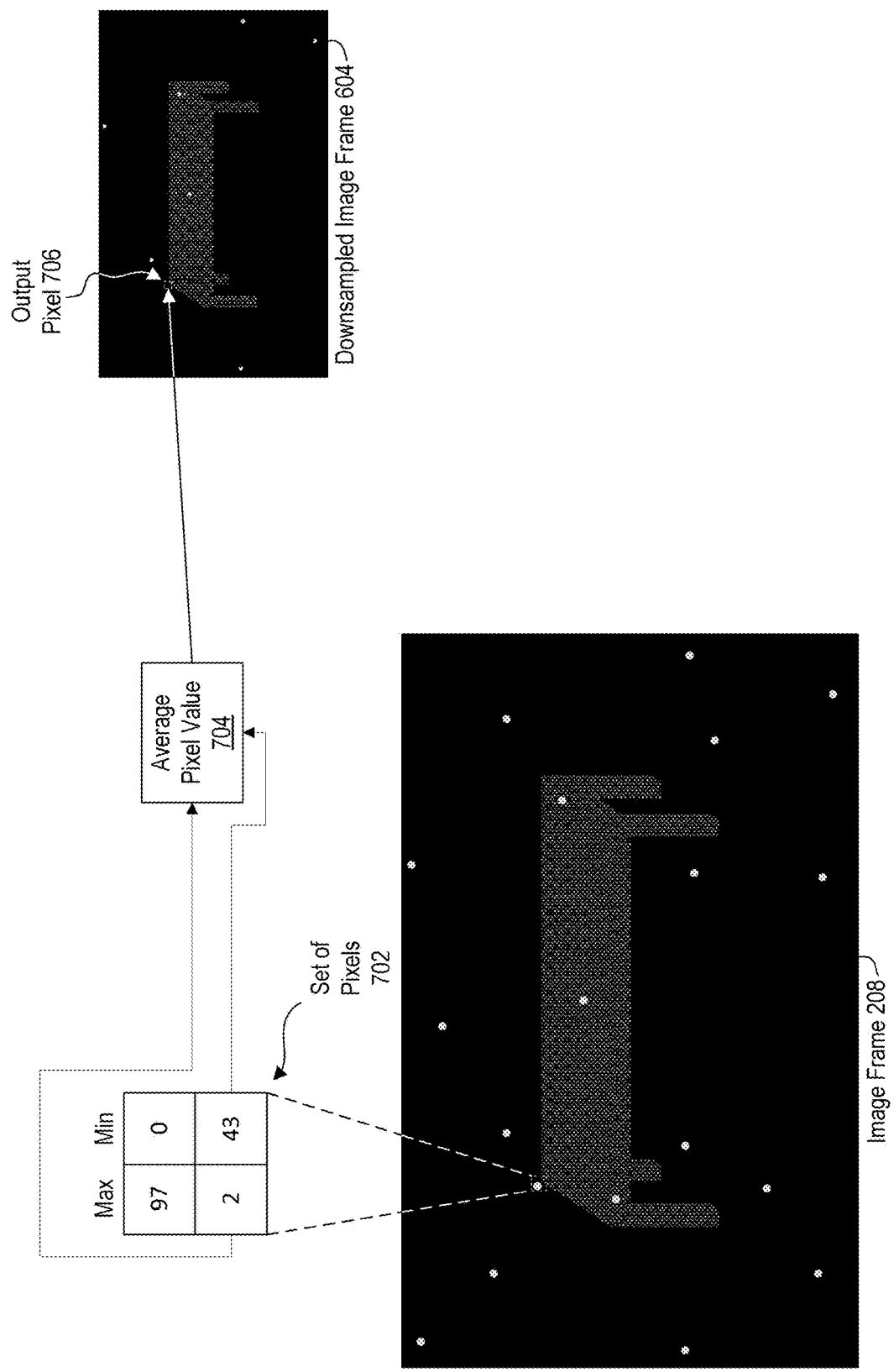
FIG. 7 illustrates a conceptual representation of performing a downsampling operation to generate a downsampled image frame.

As foreshadowed above, FIGS. 6 and 7 provide additional details related to the low-pass filtering 302 discussed hereinabove with reference to FIG. 3. The techniques discussed with reference to FIGS. 6 and 7 may be regarded as hierarchical median filtering, which may approximate the performance of a conventional median filter (e.g., with a large kernel) without relying on computationally and/or time intensive sorting operations.

FIG. 6 depicts downsampling 602 performed on the image frame 208 (e.g., of FIGS. 2 through 5) to generate a downsampled image frame 604. The downsampling 602 comprises generating output pixels for the downsampled image frame 604 based on input pixels of the input image (e.g., image frame 208). In some instances, each output pixel of the downsampled image frame 604 is generated as a mean or median of a respective set of input pixels from the input image (e.g., image frame 208). In this regard, the downsampled image frame 604 may comprise a lower image resolution than the input image (e.g., image frame 208). For instance, the downsampling 602 may be configured to generate an output image (e.g., downsampled image frame 604) with an image size that is reduced in width by a factor of two and reduced in height by a factor of two (other factors may be used). Additional examples related to downsampling 602 are provided below with reference to FIG. 7.

FIG. 6 also illustrates a decision block 606, whereupon, if a stop condition is not satisfied (indicated in FIG. 6 by the "No" proximate to the decision block 606), downsampling 602 may be performed again using the previously downsampled image frame 604 as input. In this regard, downsampling 602 may be iteratively performed until a stop condition is satisfied. Any suitable stop condition is within the scope of the present disclosure, such as completion of a predetermined number of iterations, achieving a predetermined output image size or image resolution, achieving a particular amount of noise reduction, etc.

After generating a downsampled image frame 604 via downsampling 602 (whether using the image frame 208 or a previously downsampled image frame 604 as input) and upon determining that the stop condition is satisfied (indicated in FIG. 6 by the "Yes" proximate to the decision block 606), a system may output a low-pass filtered image 308, which may comprise the most recently generated downsampled image frame 604. The example processes discussed in FIG. 6 may constitute low-pass filtering 302 of image frame 208 to generate the low-pass filtered image 308 (see FIG. 3).

As noted above, the performance of iterative downsampling 602 as noted in FIG. 6 may be regarded as hierarchical median filtering. FIG. 7 provides additional details related to the downsampling 602 that enable iterative downsampling operations to approximate a median filter (e.g., with a large kernel) while avoiding computationally and time intensive sorting operations. FIG. 7 illustrates the image frame 208 of FIGS. 2 through 4 and 6, as well as a representation of the downsampled image frame 604 of FIG. 6 generated via downsampling 602. As noted above, pursuant to downsampling 602, each output pixel of the downsampled image frame 604 may be generated based on a mean or median computed from a respective set of input pixels from the input image (e.g., the image frame 208).

FIG. 7 illustrates a set of pixels 702 of the image frame 208 (input image) that may be used to generate an output pixel 706 of the downsampled image frame 604 (output image). FIG. 7 shows that the pixels of the set of pixels 702 comprise respective pixel values (e.g., intensity values), including pixel values of 97, 0, 2, and 43. Pursuant to downsampling 602, an average pixel value 704 may be computed based on the set of pixels 702, and the average pixel value 704 may be used as the pixel value for the output pixel 706. However, as illustrated in FIG. 7, the maximum pixel value and the minimum pixel value of the set of pixels 702 may be excluded from the calculation of the average pixel value 704. For example, FIG. 7 shows labels of "Max" and "Min" associated with the pixel values 97 and 0, respectively. FIG. 7 also shows arrows extending from the pixel values of 2 and 43 toward the average pixel value 704, while omitting arrows extending from the pixel values of 97 and 0 (the Max and Min) toward the average pixel value 704.

Stated alternatively, the value for the output pixel 706 may be determined by computing a total pixel value as a sum of the pixel values of the set of pixels 702, determining the maximum value and the minimum value from the pixel values of the set of pixels 702, subtracting the maximum value and the minimum value from the total pixel value, and dividing the total pixel value by two.

By excluding or otherwise removing the Max and Min pixel values of the set of pixels 702 from the calculation of the average pixel value 704, only the remaining two intermediate pixel values are used to determine the average pixel value 704, causing the average pixel value 704 to represent the median pixel value of the entire set of pixels 702. Thus, a representation of the median of the four pixel values of the set of pixels 702 may be obtained without sorting operations. Such downsampling operations may be used to generate each output pixel for the downsampled image frame 604. Although the downsampling depicted in FIG. 7 only reduces 4 pixels in the input image to a single pixel in the output image (resulting in a reduction in height by a factor of 2 and in width by a factor of 2), the downsampling depicted in FIG. 7 may be repeated to approximate the output of a large-kernel median filter (e.g., by iterative performance, as discussed above with reference to FIG. 6).

Figure 8:
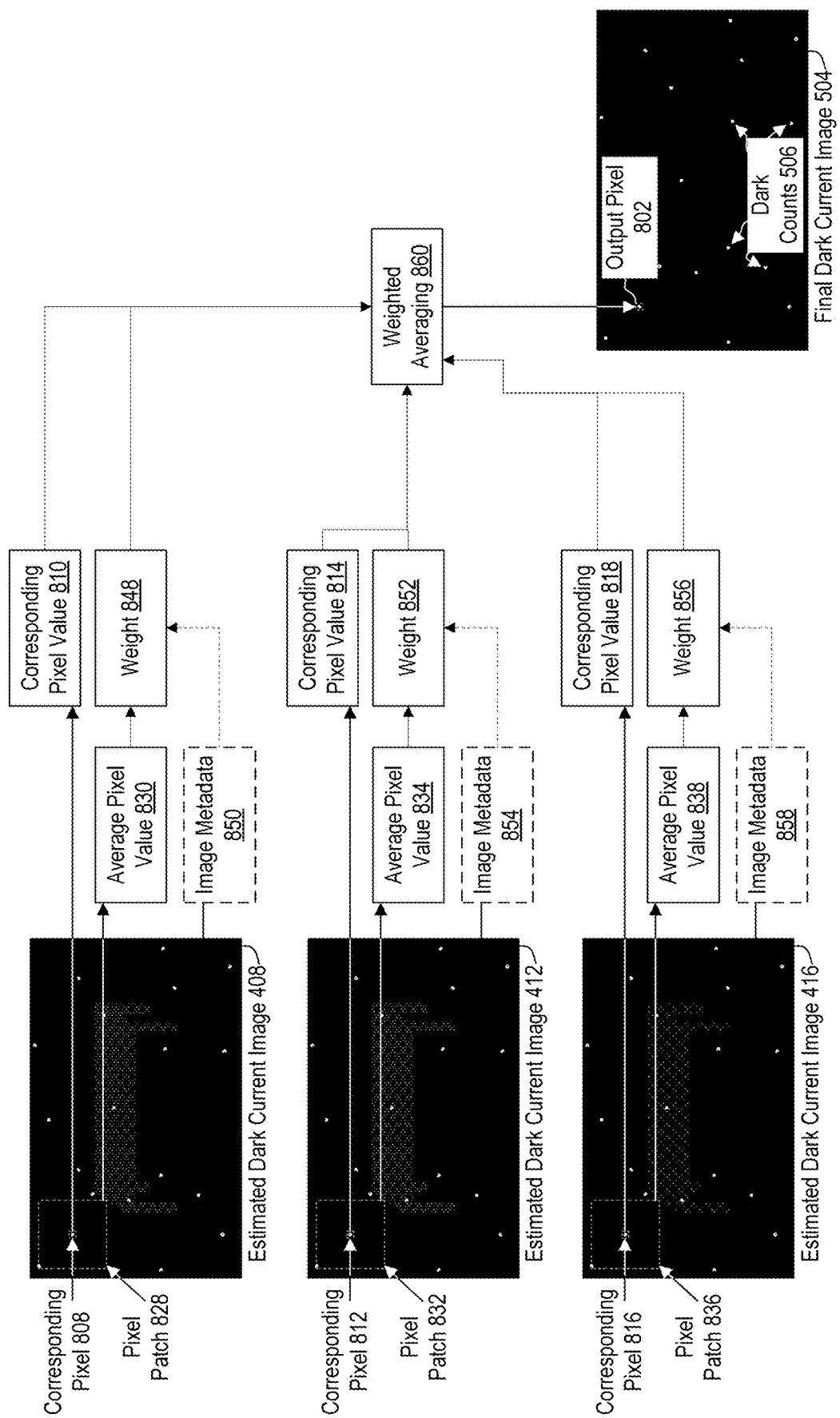
FIG. 8 illustrates a conceptual representation of generating an output pixel of a final dark current image based on corresponding pixels of estimated dark current images.

As noted above, with reference to FIG. 4, a low-pass filtered image may be subtracted from an initial image frame to generate an estimated dark current image (e.g., estimated dark current images 408, 412, and 416), and, with reference to FIG. 5, multiple estimated dark current image frames may be used to generate a final dark current image via weighted averaging (e.g., weighted averaging 502 for generating final dark current image 504). FIG. 8 provides additional details related to weighted averaging of input pixels of estimated dark current images to generate output pixels of a final dark current image.

In particular, FIG. 8 shows the estimated dark current images 408, 412, and 416 from the examples discussed above with reference to FIG. 5. FIG. 8 also shows the final dark current image 504 of FIG. 5, with emphasis on a particular output pixel 802 thereof. FIG. 8 furthermore depicts weighted averaging 860 to determine the pixel value for the output pixel 802 of the final dark current image 504. A general representation of the formula for determining a weighted average is provided below in Equation (1) for reference:

$$W = \frac{\sum_{i=1}^{n} w_i x_i}{\sum_{i=1}^{n} w_i} \quad (1)$$

where W represents the weighted average, n represents the number of terms to be averaged, $x_i$ represents the data values to be averaged, and $w_i$ represents the weights to be applied to the data values to be averaged.

For the output pixel 802 (and, without loss of generality, for any output pixel of the final dark current image 504), the pixel coordinates of the output pixel 802 may be used to determine a set of corresponding pixels from the input image frames (e.g., estimated dark current images 408, 412, and 416) that have common pixel coordinates. For instance, FIG. 8 illustrates corresponding pixel 808 of estimated dark current image 408, corresponding pixel 812 of estimated dark current image 412, and corresponding pixel 816 of estimated dark current image 416, each of which has pixel coordinates that are common with the coordinates of the output pixel 802 of the final dark current image 504. In the example of FIG. 8, each of the corresponding pixels has an associated corresponding pixel value. For instance, corresponding pixel 808 has a corresponding pixel value 810, corresponding pixel 812 has a corresponding pixel value 814, and corresponding pixel 816 has a corresponding pixel value 818. These corresponding pixel values 810, 814, and 818 may be used, by way of example, as the data values to be averaged when performing weighted averaging 860 (e.g., corresponding to $x_i$ from Equation (1)).

The weights used to average these corresponding pixel values to generate the value for the output pixel 802 in accordance with weighted averaging 860 may be determined in various ways. In some instances, the weights for each particular corresponding pixel value are determined based on an average pixel value of pixels surrounding the particular corresponding pixel value. The average pixel value of the surrounding pixels may be used as input to a function, and the output of the function may provide the weight value. An example function that may be used is a negative exponential function. Utilizing a negative exponential function on an average pixel value of a pixel patch associated with the corresponding pixel value may cause the resulting weight to advantageously give more emphasis on dark regions and less emphasis on bright regions in the associated estimated dark current image. Dark regions may provide a more direct representation of dark current, since they do not capture "background" objects that may distort the representation of dark current. Bright regions, in contrast, can result in more shot noise, which may inject noise into the representation of the dark current.

Accordingly, FIG. 8 depicts a pixel patch 828 centered about corresponding pixel 808 of estimated dark current image 408, a pixel patch 832 centered about corresponding pixel 812 of estimated dark current image 412, and a pixel patch 836 centered about corresponding pixel 816 of estimated dark current image 416. FIG. 8 also depicts an average pixel value 830 computed from the pixels of the pixel patch 828 of estimated dark current image 408, an average pixel value 834 computed from the pixels of the pixel patch 832 of estimated dark current image 412, and an average pixel value 838 computed from the pixels of the pixel patch 836 of estimated dark current image 416. These average pixel values 830, 834, and 838 may be used to generate, respectively, weights 848, 852, and 856, such as by using the average pixel values 830, 834, and 838 as inputs to a weighting function (e.g., a negative exponential function or other function). The weights 848, 852, and 856 may then be used as weights (e.g., corresponding to $w_i$ from Equation (1)) with the corresponding pixel values 810, 814, and 818 (e.g., corresponding to $x_i$ from Equation (1)) to determine a value for the output pixel 802 via weighted averaging 860 (e.g., utilizing Equation (1)).

FIG. 8 also illustrates that the weights 848, 852, and/or 856 may be generated using additional or alternative inputs. For example, FIG. 8 shows image metadata 850 associated with estimated dark current image 408, image metadata 854 associated with estimated dark current image 412, and image metadata 858 associated with estimated dark current image 416. The image metadata 850, 854, and/or 858 may be used to determine the weights 848, 852, and/or 856, respectively.

The image metadata may comprise various types of information, such as, by way of non-limiting example, temporal recency, temperature, scene illuminance, pose or motion data, and/or others. For instance, because dark count prevalence can be affected by device temperature, and device temperature can change over time, greater weight may be assigned to pixels of estimated dark current images that are associated with more recent timepoints. Weights may additionally or alternatively be assigned based on differences in temperature between different estimated dark current images (and/or relative to a current device temperature). As noted above, scenes with greater illuminance may comprise greater shot noise. Thus, weights may be assigned based on scene illuminance and/or dynamic range (e.g., which may be determined based on grey level histograms), giving greater weight for scenes with low illuminance and/or dynamic range. Furthermore, in some instances, facilitating scene diversity among the estimated dark current images used to generate a final dark current image may reduce the chances of "background" objects persisting within the final dark current image. Thus, weights may be assigned based on motion data and/or variation in poses among estimated dark current images.

The image metadata may be associated with the estimated dark current image and/or with an image associated with the estimated dark current image (e.g., a captured image frame, a low-pass filtered image, etc.). Furthermore, any of the foregoing or other factors or image metadata (e.g., motion data, illuminance, dynamic range, temperature, temporal recency, etc.) may be utilized to select the set of image frames from which to generate estimated dark current images for generating the final dark current image. Furthermore, in some implementations, the final dark current image 504 is updated based on updated captured images (e.g., updated estimated dark current images generated from captured images). In some instances, the techniques described herein for obtaining dark current images (e.g., referred to as "final dark current images") are triggered or selectively activated in response to detecting a triggering event, such as detection of a low light environment (e.g., based on captured image data or other sensor data), detection of a particular device temperature, and/or others.

Figure 9:
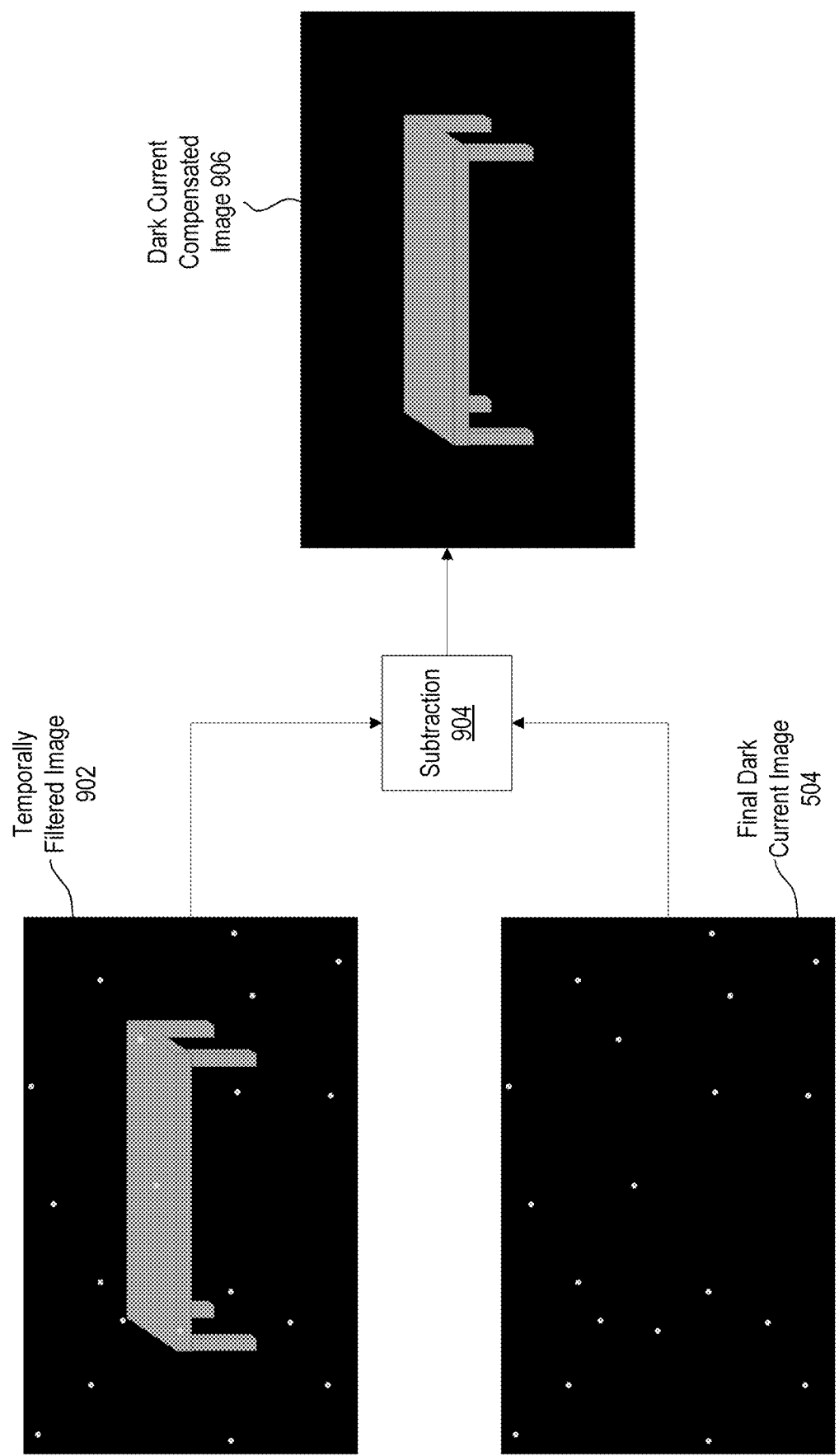
FIG. 9 illustrates a conceptual representation of generating a dark current compensated image using a temporally filtered SPAD image and a final dark current image.

FIG. 9 illustrates the estimated dark current image 504 from FIGS. 5 and 8. FIG. 9 illustrates a temporally filtered image 902, which may comprise a combination of the captured image frames 208, 212, and 216 of FIG. 2 (e.g., a motion-compensated combination of the temporally consecutive image frames). FIG. 9 furthermore shows subtraction 904 performed to subtract the dark current image 504 from the temporally filtered image 902 to provide a dark current compensated image 906, from which the dark current noise is substantially removed. On will appreciate, in view of the present disclosure, that a final dark current image may be subtracted from any image frame, whether the image comprises a temporally filtered combination of multiple captured image frames or not.

The disclosed techniques and embodiments may thus be implemented to facilitate run-time generation of dark current images, thereby accommodating changes in sensor condition and/or imaging conditions that may occur after initial camera calibration. Such dark current images may be used for generation of dark current compensated images, which may be used for various purposes (e.g., improved pass-through imagery in low light or low visibility environments).

Example Method(s) for Obtaining Dark Current Images

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 10:
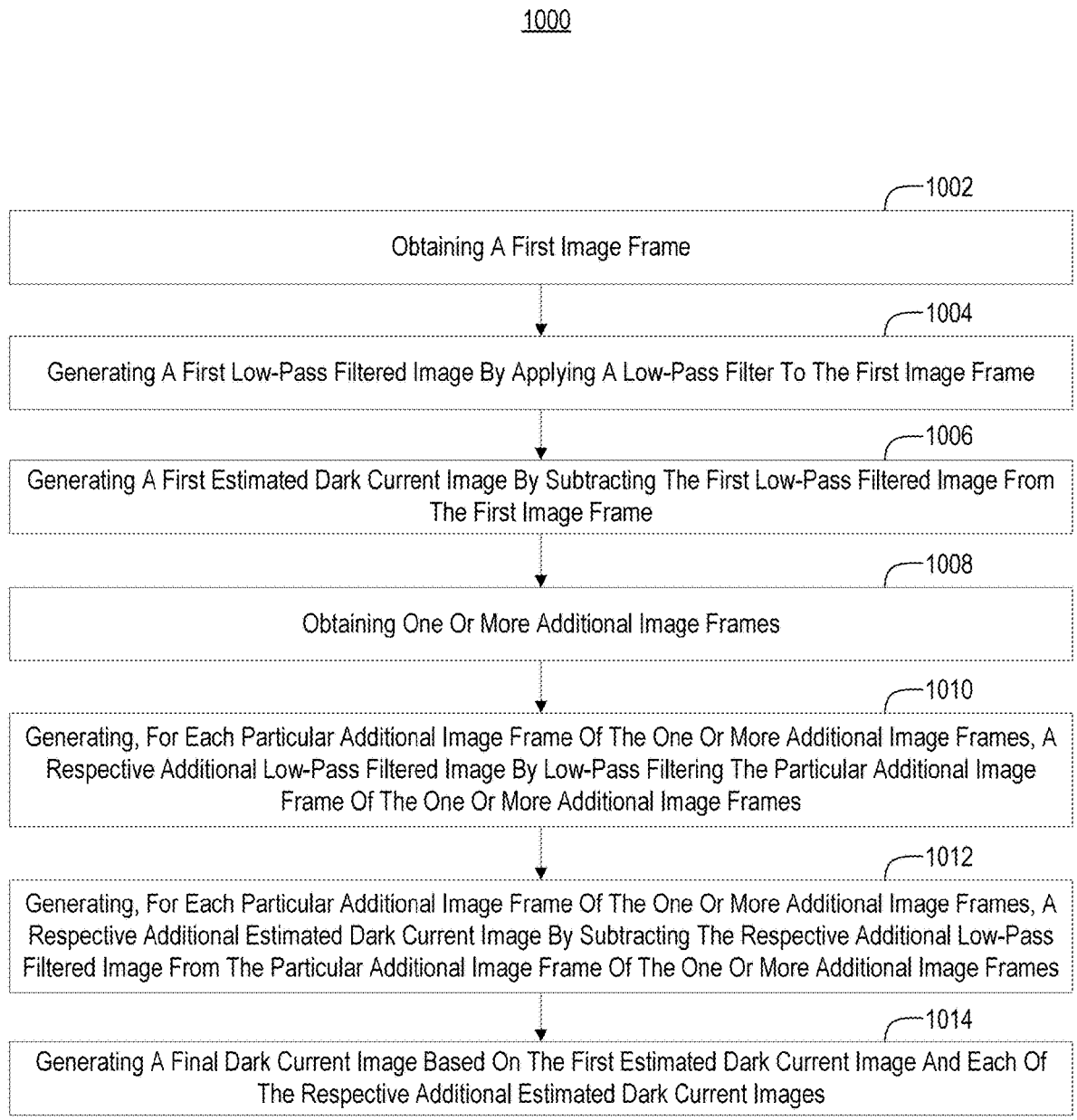
FIG. 10 illustrates an example flow diagram depicting acts associated with obtaining a dark current image.

FIG. 10 illustrates an example flow diagram 1000 depicting acts associated with obtaining a dark current image. The discussion of the various acts represented in flow diagram 1000 include references to various hardware components described in more detail with reference to FIG. 1.

Act 1002 of flow diagram 1000 includes obtaining a first image frame. Act 1002 is performed, in some instances, utilizing one or more components of a system 100 (e.g., processor(s) 102, storage 104, sensor(s) 110, SPAD array(s) 112), I/O system(s) 114, communication system(s) 116) and/or other components. In some instances, the first image frame is captured using an image sensor, such as a single photon avalanche diode (SPAD) array comprising a plurality of SPAD pixels.

Act 1004 of flow diagram 1000 includes generating a first low-pass filtered image by applying a low-pass filter to the first image frame. Act 1004 is performed, in some instances, utilizing one or more components of a system 100 (e.g., processor(s) 102, storage 104, sensor(s) 110, SPAD array(s) 112), I/O system(s) 114, communication system(s) 116) and/or other components. In some implementations, the low-pass filter comprises a median filter, or a hierarchical median filter. In some implementations, applying a hierarchical median filter to the first image frame comprises: (i) until a stop condition is satisfied, iteratively performing one or more downsampling operations and (ii) responsive to the stop condition being satisfied, outputting the first low-pass filtered image.

In some instances, for each of the one or more downsampling operations, each respective output pixel is generated based on a mean or median computed from a respective set of input pixels. Each respective set of input pixels may comprises four input pixels.

Furthermore, in some implementations, each of the one or more downsampling operations reduces image width by a factor of two and reduces image height by a factor of two. Each respective output pixel may be generated by: (i) excluding a respective maximum-value pixel from the respective set of input pixels, (ii) excluding a respective minimum-value pixel from the respective set of input pixels, and (iii) computing an average value of remaining pixels of the respective set of input pixels.

Put differently, in some implementations, each respective output pixel is generated by: (i) computing a sum of pixel values of each pixel of the respective set of input pixels, (ii) determining a maximum value of a respective maximum-value pixel from the respective set of input pixels, (iii) determining a minimum value a respective minimum-value pixel from the respective set of input pixels, (iv) computing a modified sum by subtracting the maximum value and the minimum value from the sum, and (v) dividing the modified sum by two.

The stop condition may comprise performance of a predetermined number of iterations.

Act 1006 of flow diagram 1000 includes generating a first estimated dark current image by subtracting the first low-pass filtered image from the first image frame. Act 1006 is performed, in some instances, utilizing one or more components of a system 100 (e.g., processor(s) 102, storage 104, sensor(s) 110, SPAD array(s) 112), I/O system(s) 114, communication system(s) 116) and/or other components.

Act 1008 of flow diagram 1000 includes obtaining one or more additional image frames. Act 1008 is performed, in some instances, utilizing one or more components of a system 100 (e.g., processor(s) 102, storage 104, sensor(s) 110, SPAD array(s) 112), I/O system(s) 114, communication system(s) 116) and/or other components. In some implementations, the one or more additional image frames are selected based on motion data, illuminance, or dynamic range associated with the one or more additional image frames.

Act 1010 of flow diagram 1000 includes generating, for each particular additional image frame of the one or more additional image frames, a respective additional low-pass filtered image by low-pass filtering the particular additional image frame of the one or more additional image frames. Act 1010 is performed, in some instances, utilizing one or more components of a system 100 (e.g., processor(s) 102, storage 104, sensor(s) 110, SPAD array(s) 112), I/O system(s) 114, communication system(s) 116) and/or other components. The respective additional low-pass filtered image(s) may be generated in accordance with the principles discussed hereinabove with reference to act 1004.

Act 1012 of flow diagram 1000 includes generating, for each particular additional image frame of the one or more additional image frames, a respective additional estimated dark current image by subtracting the respective additional low-pass filtered image from the particular additional image frame of the one or more additional image frames. Act 1012 is performed, in some instances, utilizing one or more components of a system 100 (e.g., processor(s) 102, storage 104, sensor(s) 110, SPAD array(s) 112), I/O system(s) 114, communication system(s) 116) and/or other components.

Act 1014 of flow diagram 1000 includes generating a final dark current image based on the first estimated dark current image and each of the respective additional estimated dark current images. Act 1014 is performed, in some instances, utilizing one or more components of a system 100 (e.g., processor(s) 102, storage 104, sensor(s) 110, SPAD array(s) 112), I/O system(s) 114, communication system(s) 116) and/or other components. In some implementations, generating the final dark current image comprises computing a weighted average of the first estimated dark current image and each of the respective additional estimated dark current images. Computing the weighted average may comprise: (i) for each particular set of output pixel coordinates of the final dark current image, obtaining a set of corresponding pixel values, the set of corresponding pixel values comprising pixel values associated with pixels of the first estimated dark current image and each of the respective additional estimated dark current images that have pixel coordinates that match the particular set of output pixel coordinates of the final dark current image, (ii) for each particular pixel value of the set of corresponding pixel values, determining a respective weight, the respective weight being determined based on a respective average pixel value computed from a respective pixel patch centered on the pixel associated with the particular pixel value, and (iii) for each particular set of output pixel coordinates of the final dark current image, calculate an output pixel value as a weighted average of the set of corresponding pixel values using the respective weights.

In some implementations, each of the respective weights is determined as a negative exponential of the respective average pixel value. Furthermore, in some implementations, the weighted average utilizes weights assigned based at least in part on temporal recency associated with the first estimated dark current image and each of the respective additional estimated dark current images.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for obtaining a dark current image, comprising:
   one or more processors; and
   one or more hardware storage devices storing instructions that are executable by the one or more processors to:
   obtain a first image frame;
   generate a first low-pass filtered image by applying a low-pass filter to the first image frame;
   generate a first estimated dark current image by subtracting the first low-pass filtered image from the first image frame;
   obtain one or more additional image frames;
   generate, for each particular additional image frame of the one or more additional image frames, a respective additional low-pass filtered image by low-pass filtering the particular additional image frame of the one or more additional image frames;
   generate, for each particular additional image frame of the one or more additional image frames, a respective additional estimated dark current image by subtracting the respective additional low-pass filtered image from the particular additional image frame of the one or more additional image frames; and
   generate a final dark current image based on the first estimated dark current image and each of the respective additional estimated dark current images, wherein generating the final dark current image comprises computing a weighted average of the first estimated dark current image and each of the respective additional estimated dark current images, and wherein computing the weighted average comprises:
   for each particular set of output pixel coordinates of the final dark current image, obtaining a set of corresponding pixel values, the set of corresponding pixel values comprising pixel values associated with pixels of the first estimated dark current image and each of the respective additional estimated dark current images that have pixel coordinates that match the particular set of output pixel coordinates of the final dark current image;
   for each particular pixel value of the set of corresponding pixel values, determining a respective weight, the respective weight being determined based on a respective average pixel value computed from a respective plurality of pixels of a respective pixel patch centered on the pixel associated with the particular pixel value, wherein each of the respective weights is determined as a negative exponential of the respective average pixel value; and
   for each particular set of output pixel coordinates of the final dark current image, calculating an output pixel value as a weighted average of the set of corresponding pixel values using the respective weights.

2. The system of claim 1, further comprising an image sensor, and wherein the first image frame is captured using the image sensor.

3. The system of claim 2, wherein the image sensor comprises a single photon avalanche diode (SPAD) array comprising a plurality of SPAD pixels.

4. The system of claim 1, wherein the low-pass filter comprises a median filter, a mean filter, or a Gaussian filter.

5. The system of claim 4, wherein the median filter comprises a hierarchical median filter.

6. The system of claim 5, wherein applying the hierarchical median filter to the first image frame comprises:
   until a stop condition is satisfied, iteratively performing one or more downsampling operations, wherein, for each of the one or more downsampling operations, each respective output pixel is generated based on a mean or median computed from a respective set of input pixels; and responsive to the stop condition being satisfied, outputting the first low-pass filtered image.

7. The system of claim 6, wherein the stop condition comprises performance of a predetermined number of iterations.

8. The system of claim 6, wherein each of the one or more downsampling operations reduces image width by a factor of two and reduces image height by a factor of two.

9. The system of claim 6, wherein each respective output pixel is generated by:
excluding a respective maximum-value pixel from the respective set of input pixels;
excluding a respective minimum-value pixel from the respective set of input pixels; and
computing an average value of remaining pixels of the respective set of input pixels.

10. The system of claim 6, wherein each respective set of input pixels comprises four input pixels.

11. The system of claim 10, wherein each respective output pixel is generated by:
computing a sum of pixel values of each pixel of the respective set of input pixels;
determining a maximum value of a respective maximum-value pixel from the respective set of input pixels;
determining a minimum value of a respective minimum-value pixel from the respective set of input pixels;
computing a modified sum by subtracting the maximum value and the minimum value from the sum; and
dividing the modified sum by two.

12. The system of claim 1, wherein the one or more additional image frames are selected based on motion data, illuminance, or dynamic range associated with the one or more additional image frames.

13. The system of claim 1, wherein the weighted average utilizes weights assigned based at least in part on temporal recency associated with the first estimated dark current image and each of the respective additional estimated dark current images.

14. A method for obtaining a dark current image, comprising:
obtaining a first image frame;
generating a first low-pass filtered image by applying a low-pass filter to the first image frame;
generating a first estimated dark current image by subtracting the first low-pass filtered image from the first image frame;
obtaining one or more additional image frames;
generating, for each particular additional image frame of the one or more additional image frames, a respective additional low-pass filtered image by low-pass filtering the particular additional image frame of the one or more additional image frames;
generating, for each particular additional image frame of the one or more additional image frames, a respective additional estimated dark current image by subtracting the respective additional low-pass filtered image from the particular additional image frame of the one or more additional image frames; and
generating a final dark current image based on the first estimated dark current image and each of the respective additional estimated dark current images, wherein generating the final dark current image comprises computing a weighted average of the first estimated dark current image and each of the respective additional estimated dark current images, and wherein computing the weighted average comprises:
for each particular set of output pixel coordinates of the final dark current image, obtaining a set of corresponding pixel values, the set of corresponding pixel values comprising pixel values associated with pixels of the first estimated dark current image and each of the respective additional estimated dark current images that have pixel coordinates that match the particular set of output pixel coordinates of the final dark current image;
for each particular pixel value of the set of corresponding pixel values, determining a respective weight, the respective weight being determined based on a respective average pixel value computed from a respective plurality of pixels of a respective pixel patch centered on the pixel associated with the particular pixel value, wherein each of the respective weights is determined as a negative exponential of the respective average pixel value; and
for each particular set of output pixel coordinates of the final dark current image, calculating an output pixel value as a weighted average of the set of corresponding pixel values using the respective weights.

15. One or more hardware storage devices storing instructions that are executable by one or more processors of a system to obtain a dark current image by configuring the system to:
obtain a first image frame;
generate a first low-pass filtered image by applying a low-pass filter to the first image frame;
generate a first estimated dark current image by subtracting the first low-pass filtered image from the first image frame;
obtain one or more additional image frames;
generate, for each particular additional image frame of the one or more additional image frames, a respective additional low-pass filtered image by low-pass filtering the particular additional image frame of the one or more additional image frames;
generate, for each particular additional image frame of the one or more additional image frames, a respective additional estimated dark current image by subtracting the respective additional low-pass filtered image from the particular additional image frame of the one or more additional image frames; and
generate a final dark current image based on the first estimated dark current image and each of the respective additional estimated dark current images, wherein generating the final dark current image comprises computing a weighted average of the first estimated dark current image and each of the respective additional estimated dark current images, and wherein computing the weighted average comprises:
for each particular set of output pixel coordinates of the final dark current image, obtaining a set of corresponding pixel values, the set of corresponding pixel values comprising pixel values associated with pixels of the first estimated dark current image and each of the respective additional estimated dark current images that have pixel coordinates that match the particular set of output pixel coordinates of the final dark current image;
for each particular pixel value of the set of corresponding pixel values, determining a respective weight, the respective weight being determined based on a respective average pixel value computed from a respective plurality of pixels of a respective pixel patch centered on the pixel associated with the particular pixel value, wherein each of the respective weights is determined as a negative exponential of the respective average pixel value; and for each particular set of output pixel coordinates of the final dark current image, calculating an output pixel value as a weighted average of the set of corresponding pixel values using the respective weights.

\* \* \* \* \*